United States Patent [19]
Yamaguchi et al.

[11] 3,743,318
[45] July 3, 1973

[54] VEHICULAR SAFETY DEVICE

[75] Inventors: Michio Yamaguchi, Yokohama; Yasuhiro Saito, Tokyo; Tsugio Noda, Kawagoe; Shinzo Tsuji, Kawagoe; Takashi Mitani, Kawagoe, all of Japan

[73] Assignee: Nissan Motor Company Limited, Yokohama, Japan

[22] Filed: Apr. 23, 1971

[21] Appl. No.: 136,856

[30] Foreign Application Priority Data
Apr. 25, 1970 Japan.............................. 45/40412

[52] U.S. Cl. .............. 280/150 AB, 137/68, 169/28
[51] Int. Cl. ............................................ B60r 21/08
[58] Field of Search .............. 280/150 AB; 23/281; 102/39, 38; 137/68; 169/28

[56] References Cited
UNITED STATES PATENTS

| | | | |
|---|---|---|---|
| 3,567,245 | 3/1971 | Ekstrom ..................... | 280/150 AB |
| 3,242,666 | 3/1966 | Peterson ..................... | 280/150 AB |
| 2,712,811 | 7/1955 | Mathisen ..................... | 102/46 UX |
| 3,089,418 | 5/1963 | Stiefel ..................... | 102/39 |
| 2,736,459 | 2/1956 | Cockram et al. ..................... | 137/68 |
| 3,600,003 | 8/1971 | Carey ..................... | 280/150 AB |
| 3,525,536 | 8/1970 | Pruneski ..................... | 280/150 AB |
| 3,638,964 | 2/1972 | Chute ..................... | 280/150 AB |
| 3,191,533 | 6/1965 | Hopson ..................... | 102/24 HC |
| 2,436,364 | 2/1948 | McDowell ..................... | 169/28 X |
| 2,872,870 | 2/1959 | Gey ..................... | 102/39 X |

*Primary Examiner*—Leo Friaglia
*Assistant Examiner*—John P. Silverstrim
*Attorney*—McCarthy, Depaoli & O'Brien

[57] ABSTRACT

Herein disclosed is a vehicular safety device which is adapted to protect a vehicle occupant or a pedestrian from injury in the event of a collision of a motor vehicle. The safety device has an inflatable protective bag which is arranged to be rapidly expanded to a protective position when the motor vehicle encounters the collision. The inflatable bag is expanded by a pressurized gas which is supplied from an appropriate pressurized gas reservoir through a mechanism which is responsive to the collision and which has rupturable sealing means including an explosive means activated at the moment the collision takes place.

4 Claims, 3 Drawing Figures

VEHICULAR SAFETY DEVICE

This invention relates to a vehicular safety device, and more particularly to a vehicular safety device including an inflatable confinement or a protective bag which is expanded to a position in which a vehicle occupant or a pedestrian is protected from injury during a collision of a motor vehicle.

The inflatable confinement in the expanded protective position is located to intervene between the vehicle occupant and structural parts such as a windshield, an instrument panel, a steering wheel and a seat back of the motor vehicle or between the pedestrian and external parts of the motor vehicle whereby shocks and impacts resulting from the collision are absorbed.

In order that the vehicular safety device of the described nature operates reliably, it is of critical importance that the inflatable confinement be expanded and projected to its protective position as fast as possible when the motor vehicle encounters a collision. Improvements have therefore been made on the safety device so that the collision condition is detected instantaneously and that the inflatable confinement assumes the protective position as rapidly as possible.

The inflatable confinement, which is normally held in a collapsed position, is expanded with a pressurized gas which is supplied from an appropriate pressurized gas supply unit. This unit includes a normally closed pressurized gas reservoir adapted to for storing the pressurized gas and a suitable sealing means normally closing the pressurized gas reservoir. The sealing means is operatively connected with an impact-responsive triggering means which is adapted to be actuated in response to the collision condition of the motor vehicle. The sealing means is released from the pressurized gas reservoir when the triggering means is actuated, admitting the pressurized gas into the collapsed inflatable confinement. This invention is thus directed generally to the thus arranged pressurized gas supply unit and more specifically to the sealing means of this particular unit.

It is, therefore, an object of this invention to provide a vehicular safety device having an improved pressurized gas supply unit by which the pressurized gas is supplied to the inflatable confinement immediately when the triggering means is actuated during the collision of the motor vehicle.

Another object of this invention is to provide a vehicular safety device having an improved pressurized gas supply unit which is simple in construction and which offers ease of assembling during production.

A general object of this invention is thus to provide a vehicular safety device which operates reliably and which can be manufactured economically.

These and other objects and features of this invention are attained basically in a vehicular safety device which comprises an inflatable confinement of the described character, pressurized gas reservoir having a pressurized gas discharge spout, rupturable sealing means releasably in closing engagement with the discharge spout, a housing secured to the pressurized gas generator for enclosing the discharge spout and the sealing means and having formed therein an openings communicating with the inflatable confinement, and an impact-responsive triggering means which is operatively connected with the sealing means and which is adapted to be actuated in response to an impact resulting from the collision of the motor vehicle. The rupturable sealing means includes a receptacle retaining therein an explosive means which is adapted to be activated when the triggering means is actuated for rupturing the sealing means and consequently providing communication between the discharge spout of the pressurized gas reservoir and the inflatable confinement through the openings formed in the housing. The pressurized gas is in this manner admitted into the collapsed inflatable confinement which is accordingly inflated to the protective position. The rupturable sealing means may include, in addition to the receptacle, a sealing member which is releasably attached to the discharge spout of the pressurized gas reservoir through which the sealing means is in closing engagement with the discharge spout. This sealing member is released from the discharge spout when the sealing means is ruptured. The explosive means retained in the receptacle may comprise an explosive charge stored in the receptacle and an igniter or a squib which is in contact with the explosive charge and which is connected to the triggering means so that the explosive charge is blasted when the igniter or squib is fired on actuation of the triggering means.

Drawings illustrate preferred embodiments of this invention, in which.

Figure 1:
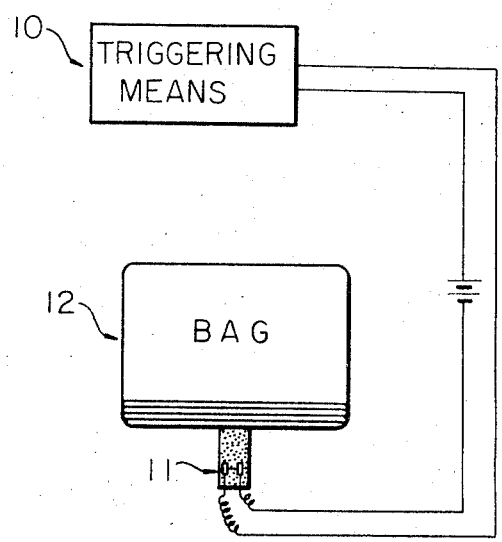
FIG. 1 is a schematic view showing a general construction of the vehicular safety device which is dealt with by this invention.

Reference is first made to FIG. 1 showing a general construction of the vehicular safety device in which the improvement proposed by this invention is to be incorporated. The safety device largely consists of an impact-responsive triggering means 10 which is adapted to be actuated in response to an impact resulting from the collision of the motor vehicle. Since the manner in which the triggering means 10 responds to the impact and is actuated thereby may be as desired, no specific description thereof will be incorporated herein. The triggering means 10 is operatively connected to a pressurized gas supply unit 11 which is connected to supply a pressurized gas to an inflatable confinement or a protective bag 12 when the triggering means 10 is actuated. The pressurized gas supply unit 11 includes a pressurized gas reservoir which may be constructed and arranged in any desired manner. The pressurized gas reservoir, for instance, may contain a gas under pressure or a liquefied gas which is ready for conversion into a gas under pressure. Or otherwise, the pressurized gas reservoir may contain an explosive which is adapted to produce a gas under pressure when activated or blown up by suitable means. The inflatable confinement 12 is adapted to be secured to any part or parts of the motor vehicle. and is normally stowed in a collapsed or folded position and, when expanded with the pressurized gas supplied from the pressurized gas supply unit 11, the inflatable confinement is expanded and projected to a position intervening between the vehicle occupant and the structural parts of the vehicle cabin or between the pedestrian and the external structural parts of the motor vehicle, as previously noted.

Of the units diagrammatically illustrated in FIG. 1, the pressurized gas supply unit 11 in particular is improved by this invention with a view to rapidly passing the pressurized gas to the inflatable confinement 12 when the triggering means 10 is actuated. A preferred form of the pressurized gas supply unit constructed to this end is now illustrated in FIG. 2.

Figure 2:
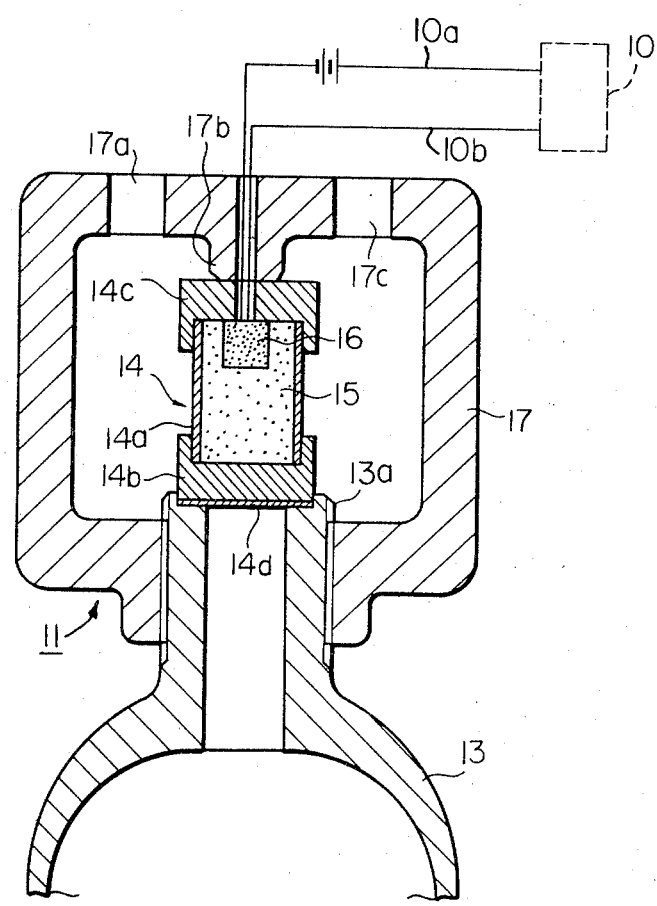
FIG. 2 is a sectional view of a pressurized gas supply unit of the safety device according to this invention.

Referring to FIG. 2, the pressurized gas supply unit 11 largely consists of a pressurized gas reservoir 13 and a rupturable sealing means 14. The pressurized gas reservoir 13, partially shown in section, is constructed and arranged in any desired manner as previously discussed and releases the pressurized gas when opened. The gas reservoir 13 is provided with a pressurized gas discharge spout 13a which is normally closed by the rupturable sealing means 14. This rupturable sealing means 14 is thus releasably in closing engagement with the end of the discharge spout 13a. The sealing means 14 includes a receptacle (not numbered) which comprises a rupturable, open-ended hollow member 14a axially aligned with the discharge spout 13a, and end plates 14b and 14c attached to both ends of the hollow member 14a. The end plate 14b engages with the leading end of the spout 13a through a sealing member 14d forming part of the rupturable sealing means 14. The receptacle retains therein an explosive means (not numbered) which is operatively connected with and activated by the impact-responsive triggering means 10 which is previously mentioned. More specifically, the explosive means is made up of an explosive charge 15 stored in the receptacle and an igniter 16 which is contiguous with the explosive charge 15, as illustrated. A housing 17 is threadedly secured to the discharge spout 13a of the pressurized gas reservoir 13, enclosing the discharge spout 13a thereof and the rupturable sealing means 14. The housing 17 has in its end wall openings 17a and 17c which communicate with the interior of the inflatable confinement 12 (FIG. 1). A retaining member 17b projects from an inner surface of an end wall of the housing 17 and is in abutting engagement with the end plate 14c of the receptacle, whereby the sealing means 14 in its entirety is in closing engagement with the discharge spout 13a. The retaining member 17b is herein shown as integral with the housing 17. Where the impact-responsive triggering means 10 is of the electrically operative type, the igniter or squib 16 may be connected to the triggering means by lines 10a and 10b passed through aligned apertures formed in the end plate 14c and the end wall of the housing 17, When, now, the motor vehicle encounters a collision while it is travelling, the impact-responsive triggering means 10 responds to the collision condition. The triggering means 10 is actuated to fire the igniter or squib 16 so that the explosive charge 15 is activated or blasted. This causes the rupturable hollow structure 14 of the receptacle to be ruptured so that the sealing member 14d is instantaneously released from the discharge spout 13a of the pressurized gas reservoir 13. The sealing means 14 which is now broken into pieces is violently thrown toward the end wall of the housing 17 and the pressurized gas is admitted into the interior of the housing. The pressurized gas is then passed to the inflatable confinement 12 (FIG. 1) through the openings 17a 17c in the housing. The inflatable confinement 12 which has been stowed in the collapsed position is consequently expanded and projected to its protective position, isolating the vehicle occupant or the pedestrian from the structural parts of the motor vehicle.

Figure 3:
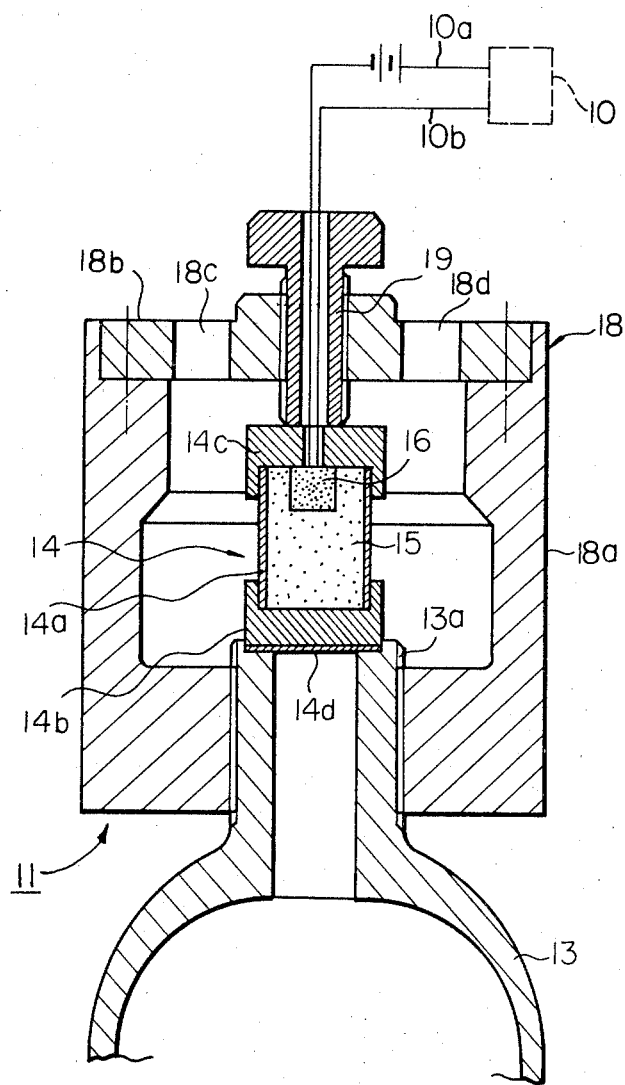
FIG. 3 is a view similar to FIG. 2 but shows a modification of the pressurized gas supply unit of FIG. 2.

FIG. 3 illustrates a modified form of the pressurized gas supply unit for use in the vehicular safety device according to this invention. This modified pressurized gas supply unit is constructed essentially similarly to the unit shown in FIG. 2 and, therefore, like reference numerals are assigned to like parts and elements.

Different from the pressurized gas supply unit of FIG. 2, the unit shown in FIG. 3 has a housing 18 made up of a hollow structure 18a with an open leading end and an end wall 18b secured to the open end of the hollow structure 18a. The end wall 18b has formed therein openings 18c and 18d and, as such, the housing 18 in its entirety is similar to the housing 17 of the pressurized gas supply unit shown in FIG. 2. Since, however, the end wall 18b is separable from the hollow structure 18a, the sealing means 14 can be installed within the housing 18 with considerable ease, as compared with the arrangement of FIG. 2, facilitating the assembly of the pressurized gas supply unit as a whole during production. Although, moreover, the retaining member 17b in the arrangement of FIG. 2 is integral with the housing 17, the modified pressurized gas supply unit has a retaining member 19 which is a piece or bolt. This retaining member 19 is screwed through the end wall 18b of the housing to abut against the end plate 14c of the receptacle of the sealing means 14, thus providing ease of conditioning the sealing means 14 relative to the discharge spout 13a during assembling or even while in use of the safety device.

In the arrangements shown in FIGS. 2 and 3, the hollow member 14a and the end plates 14b and 14c may be integral with each other so that the resultant receptacle is made up of a unitary member, if desired. Where such unitary receptacle is supported by the retaining member or bolt 19 as in the arrangement of FIG. 3, the receptacle may be integral with the retaining member of bolt, if further desired.

It will now be appreciated from the foregoing description that the pressurized gas supply unit of the vehicular safety device embodying this invention is advantageous because the pressurized gas is passed to the inflatable confinement almost instantaneously when the impact responsive triggering means is actuated and because the pressurized gas supply unit is simple in construction and economical to manufacture. The safety device according to this invention is thus not only reliable in performance but adapted for quantity production especially on account of the ease of assembling the parts.

What is claimed is:

1. A vehicular safety device for protecting a vehicle occupant or a pedestrian from injury during a collision of a motor vehicle, comprising:

A. an inflatable confinement having a collapsed stowed position and an expanded protective position;

B. a pressurized gas reservoir storing a pressurized gas and having a pressurized gas discharge spout;

C. a rupturable sealing means which comprises:
1. a rupturable, open-ended hollow member which is axially aligned with said discharge spout,
2. a pair of end plates which are attached to and spaced apart by both ends of said hollow member, one of said pair of end plates being in closing engagement with said discharge spout,
3. an explosive charge within said hollow member and between said pair of end plates, and 4. an igniter which is contiguous with said explosive charge and connected to a triggering means that is adapted to be activated in response to an impact resulting from said collision; and D. a housing which extends axially from and encloses said discharge spout, comprising:
1. an inwardly threaded open end, which is threadedly connected to said discharge spout,
2. a side wall which is radially spaced from and substantially parallel to said hollow member in enclosing relationship,
3. a retaining member, projecting toward said discharge spout from the inner surface of an end wall oppositely disposed to said open end, which is in abutting relationship to the other end plate of said pair of end plates, whereby said sealing means in its entirety is in closing engagement with said discharge spout, and
4. a plurality of openings in said end wall which are annularly disposed to said retaining member, whereby upon impact caused by a collision of said vehicle while travelling, said triggering means actuates said igniter which detonates said explosive charge, causing said hollow member to be ruptured and fragments to be hurled toward said side wall of said housing while said pressurized gas violently collapses said end plates upon said end wall and passes through said openings into said inflatable confinement.

2. A vehicular safety device according to claim 1, in which said retaining member is integral with said end wall of said housing.

3. A vehicular safety device according to claim 1, in which said retaining member is a piece which is screwed through said end wall of said housing.

4. A vehicular safety device according to claim 1, in which said housing comprises a hollow structure with an open leading end opposite said inwardly threaded open end, said endwall being secured to said open leading end.

* * * * *